Figure 1:
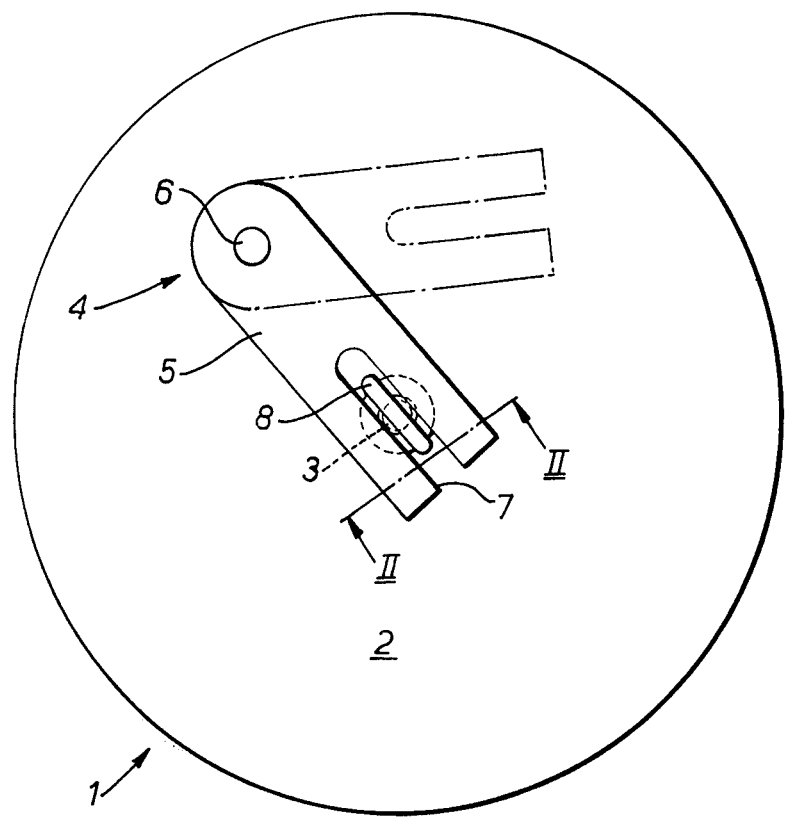

United States Patent [19]  [11]  4,191,235
Davis  [45]  Mar. 4, 1980

[54] HOLDING DEVICES

[75] Inventor: Maurice Davis, Croydon, England

[73] Assignee: Davis Industrial (Filters) Limited, Croydon, England

[21] Appl. No.: 845,782

[22] Filed: Oct. 26, 1977

[30] Foreign Application Priority Data

Jan. 28, 1977 [GB] United Kingdom ............... 3676/77

[51] Int. Cl.² ............................................. F16B 39/02
[52] U.S. Cl. ........................................ 151/55; 81/13; 151/59
[58] Field of Search ................... 81/3.1 D, 13, 121 R, 81/121 B; 151/54, 55, 56, 58, 59

[56] References Cited
U.S. PATENT DOCUMENTS 2,002,403  5/1935  Kosma ............................... 151/54 X
2,006,064  6/1935  Young ............................... 151/54 X

FOREIGN PATENT DOCUMENTS 2148029  5/1973  Fed. Rep. of Germany ......... 81/121 B
681460   2/1930  France ..................................... 151/54
49947   11/1909  Switzerland ............................ 151/54
942325  11/1963  United Kingdom ..................... 151/54

Primary Examiner—Lawrence J. Staab
Attorney, Agent, or Firm—Scrivener, Parker, Scrivener & Clarke

[57] ABSTRACT

A holding device for holding a rotatable fastener such as a thumb screw or ring nut against unintentional release, the device having a mounting adjacent the fastener and being movable relative to the mounting to engage and disengage with the fastener.

2 Claims, 7 Drawing Figures

HOLDING DEVICES

This invention relates to holding devices, and more particularly to a device for holding a selectively rotatable fastener against rotation.

The term "rotatable fastener" as used herein means a fastening device having head means of the type which may be engaged by manually operable means, such as a wrench, screw driver, or the like to exert a positive non-frictional rotary force on the device to move it from a fastening position to a release position. Nuts, screws and bayonet fasteners are examples of rotatable fasteners.

Rotatable fasteners, for example screws and bolts, are commonly used for releasably holding in an assembled condition assemblies which are frequently stripped down for inspection or maintenance. For example, it is known to secure the cover of a cylindrical filter assembly in position with a single thumb-screw which may be released to permit removal of the cover to gain access to the interior of the filter assembly. Whilst this arrangement is satisfactory when the filter assembly is mounted on a static structure, it is not entirely satisfactory when the filter assembly is mounted on a vibrating structure, since vibrations transmitted to the filter assembly may cause the thumb screw to work loose, resulting in leakage of unfiltered air through the filter or even complete loss of the cover.

According to the present invention there is provided a holding device for holding a rotatable fastener against rotation, the device comprising a body having means for engaging the head means of the rotatable fastener in a manner which prevents rotation of the fastener relative to the body, and means for mounting the body adjacent to the fastener, the arrangement being such that, in use, the body may be disengaged from the fastener and subsequently moved, while mounted, to a position in which the fastener is free to rotate.

A further problem arises in releasing a fastener when desired if, rather than a thumb screw which can be tightened and released by hand, a screw is used which is designed for tightening and release by means of a tool. If, for example, a screw with cross-slots is used, it may prove impossible to remove the screw without the correct size of screw-driver. Whilst this is no problem if the assembly in question is only intended to be stripped down in the workshop, it does present a problem if the assembly is intended to be opened for inspection or servicing by the user of the machine which incorporates the assembly. Either the user must be put to the inconvenience and expense of obtaining and keeping available the correct tool, or as is perhaps more likely in some cases, he will neglect the necessary inspection or servicing because he does not have the requisite tools. Such neglect of inspection and servicing is clearly highly undesirable.

It is therefore proposed to provide the holding device with means for releasably mounting the body adjacent to the fastener, the mounting means being manually releasable to dismount the holding device so that it may be used as a tool for releasing the rotatable fastener.

Preferably, the body is a resilient strip and the mounting means rotatably mounts the strip such that, in use, the mounted strip may be resiliently flexed to disengage it from the fastener and subsequently pivoted about the mounting means to a position where it does not prevent rotation of the fastener. With this arrangement, when tools are available for use in servicing, the strip may remain mounted and functions only as a releasable holding device for the fastener.

Figure 2:
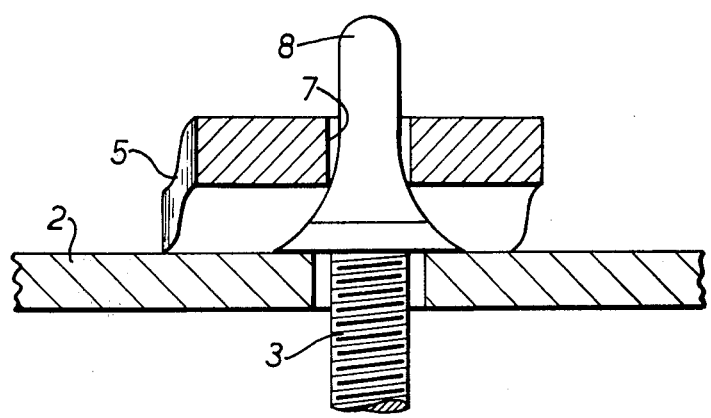
Figure 3:
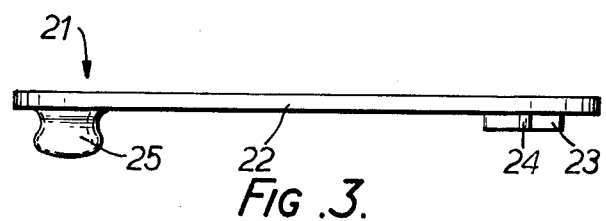
Figure 4:
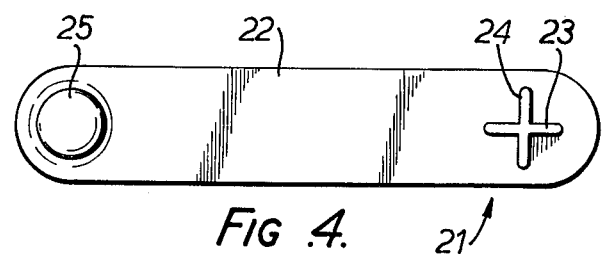
Figure 5:
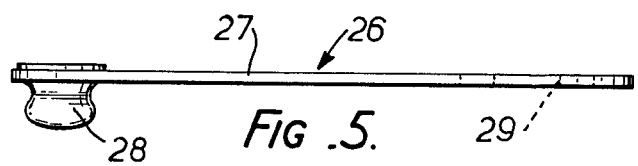
Figure 6:
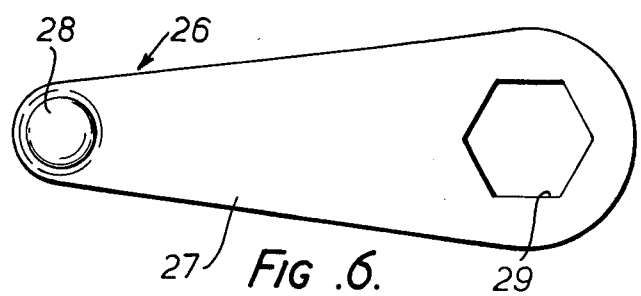
Figure 7:
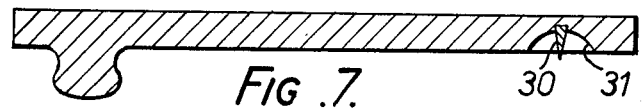

In order that the invention may be well understood there will now be described some embodiments thereof, given by way of example only, reference being had to the accompanying drawings in which:

FIG. 1 is a plan view of a filter assembly;
FIG. 2 is a section along the line II—II of FIG. 1
FIG. 3 is a side view of a second holding device;
FIG. 4 is a bottom plan view of the device of FIG. 3;
FIG. 5 is a side view of a third holding device;
FIG. 6 is a bottom plan view of the device of FIG. 5, and
FIG. 7 is a section through a holding device with a single blade and arranged to engage an upstanding screw head.

FIG. 1 is a top plan view of a cylindrical filter assembly 1. The filter assembly has a perforate cylindrical side wall (not shown) through which air is drawn to be filtered by filter elements housed within the assembly.

In order to gain access to the filter elements for inspection and cleaning, the top cover 2 of the assembly is releasably held in place by a single thumb screw 3, the top cover being removable by unscrewing the thumb screw 3.

In order to prevent the thumb screw 3 from being loosened due to vibrations imposed on the filter assembly, a holding device 4 comprising a resilient strip 5 of flexible nylon is rotatably mounted on the cover 2 by a rivet 6. The strip 5 is provided with a slot 7 which may receive the flatened head 8 of the screw to prevent rotation of the screw. If it is desired to remove the screw 3, the portion of the strip surrounding the head 8 is flexed away from the cover until it is clear of the head 8, and the strip is then rotated about the rivet 6 to the position shown in dotted lines in FIG. 1. The screw may then be freely removed. After the screw has been replaced, it may again be locked in position by the reverse of the above procedure.

In a typical application using a ¼" thumb screw a strip 5 of nylon 3½" long, 1¼" wide and ⅛" thick has been found satisfactory. The resilient strip may, of course, be of any other suitable material, for example of another resilient plastics or of rubber or of a resilient metal, e.g. spring steel.

The shape of the part of the strip which engages the rotatable fastener will, of course, depend on the shape of the exposed part of the fastener.

Referring now to FIGS. 3 to 6 various other shaped fastener engaging parts are illustrated. But these Figures also illustrate other embodiments of holding device which are demountable so as to be usable as tools on the parts which will normally be held by the holding device.

The holding device 1 shown in FIGS. 3 and 4 is a one-piece injection moulding of nylon and comprises a body 22 having cross-blades 23, 24 adjacent one end, and a snap-in pop fastener 25 adjacent the other end. The blades 23, 24 are sized to mate with the cross-slots of a screw which holds in position the cover of a filter assembly. A suitable sized hole is drilled in the cover at the correct distance from the screw so that the pop fastener 25 may be snapped into the hole to rotatably mount the holding device on the cover. In use, the screw is tightened to secure the cover in position, and the holding device 21 is positioned with the blades 23, 24 engaged in the cross-slots of the screw to lock the screw against rotation. When it is desired to remove the screw using a screwdriver, the holding device is resiliently flexed to disengage the blades from the screw slots, and is rotated about the fastener 25 to a position clear of the screw. The screw is then released using a screwdriver in the usual way. If, in the alternative, no screwdriver is available when it is desired to release the screw, the pop-fastener 25 is snapped out of the hole by manually lifting the holding device away from the cover to free the holding device, and then the holding device is itself used as a tool for releasing the screw by engaging the blades 23, 24 in the screw slots and rotating the holding device about the screw axis.

Whilst the device of FIGS. 3 and 4 has been illustrated as having integral blades, the blades could, if desired, be provided by a metal insert moulded into the body of the device. Further, although cross-blades for engagement with cross-slots have been illustrated, other screw-engaging means, for example a pozidrive blade or a hexagonal hole can be provided either as integral mouldings or by moulded in inserts. The moulded inserts may, for example, be formed by die-casting.

Referring to FIGS. 5 and 6, the holding device 26 shown comprises a thin metal body 27 provided with a plastics snap-in fastener 28 at one end. The other end of the metal body 27 is provided with a hexagonal hole 28 to snugly receive the hexagonal head of a screw. The holding device 26 is used in the same manner as the device 21 of FIGS. 3 and 4. Preferably, the body 27 is stamped from suitable strip metal, e.g. strip stainless steel, and the snap-in fastener 28 is injection moulded from a suitable plastics. The snap-in fastener may be moulded directly onto the body 27 or may be separately formed and subsequently assembled with the body.

Referring to FIG. 7 an injection moulded holding device similar to the device of FIGS. 3 and 4 is provided with a single blade 30 for engaging a slotted cheese head screw. In order to ensure correct location of such a holding device, a recess 31 is formed in the body of the device for at least partially receiving the screw head. In the alternative a skirt may be formed depending from the body instead of providing a recess.

If desired, a plurality of holding devices may be mounted for storage or transit on a suitably apertured board or sheet of plastics by pressing the snap-in fasteners into the apertures of the board or sheet of plastics.

The body or strip of the holding device may be reinforced where it is to be available as a tool. Thus, in the case of an injection moulding, the body or strip may include an insert or be shaped such as will permit the flexing for engaging and disengaging from the fastener, but be relatively rigid in the direction in which force will be applied in turning the fastener.

What is claimed is:

1. A holding device for holding against rotation a rotatable fastener of the type having head means engageable by manually operable means for exerting a positive non-frictional rotary force on the fastener to move it in fastening and unfastening directions, said device comprising a resilient body, means on said body for mechanically and directly engaging the head means of a fastener in a manner which prevents rotation of the fastener relative to said body, releasable mounting means on said body for pivotally mounting said body adjacent said fastener, said mounting means comprising a projection for making snap engagement with or snap disengagement from an appropriately sized opening, and, when engaged in said opening, retaining said body in its mounted position regardless of the pivotal movement thereof, said body comprising a resilient strip resiliently moveable axially relative to a fastener until said head engaging means of said body is clear of said head means, and said body is then pivotal, while still mounted, to a position in which the fastener is free to rotate.

2. A holding device according to claim 1 in which the strip is reinforced to resist flexing in a direction in which the force is to be applied to the strip upon release of the mounting means to release or tighten the fastener while allowing the strip to flex in the direction to disengage from a fastener head when said strip is mounted in its position of use by said mounting means.

* * * * *